E. J. COLGAN.
SUPPORT FOR FEED BAGS.
APPLICATION FILED FEB. 10, 1908.
904,046.
Patented Nov. 17, 1908.
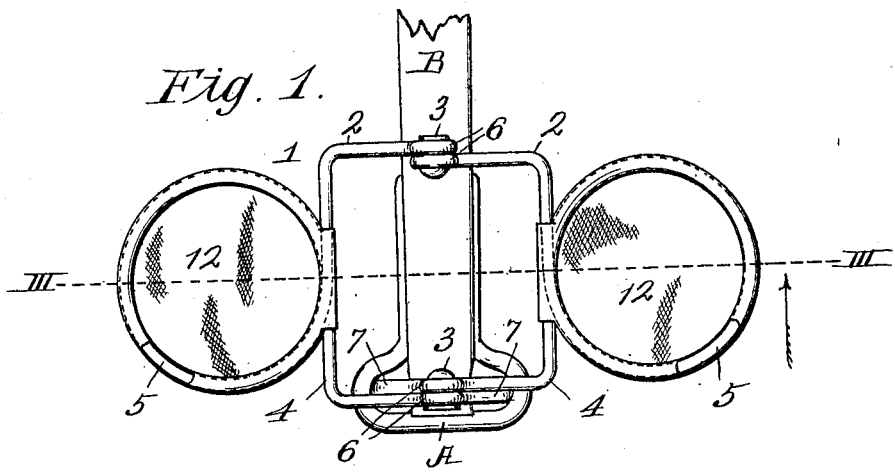
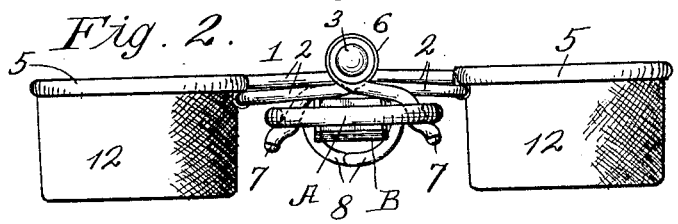
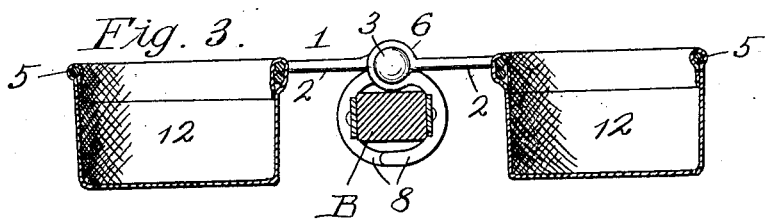
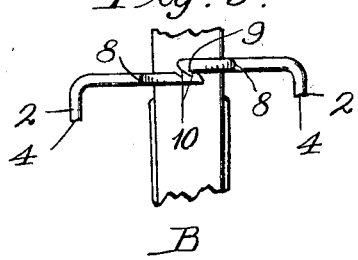
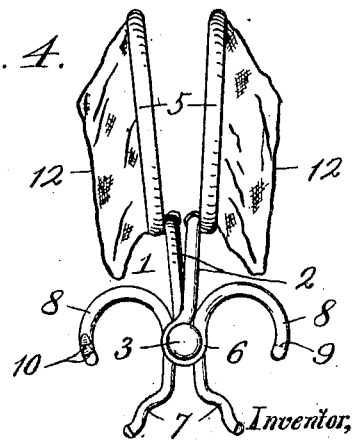
Witnesses:
R. E. Hamilton
M. Cox
Inventor,
Edward J. Colgan,
By F. G. Fischer, atty

UNITED STATES PATENT OFFICE.

EDWARD J. COLGAN, OF KANSAS CITY, KANSAS.

SUPPORT FOR FEED-BAGS.

No. 904,046.　　　Specification of Letters Patent.　　　Patented Nov. 17, 1908.

Application filed February 10, 1908.　Serial No. 415,055.

*To all whom it may concern:*

Be it known that I, EDWARD J. COLGAN, a citizen of the United States, residing at Kansas City, in the county of Wyandotte and State of Kansas, have invented certain new and useful Improvements in Supports for Feed-Bags, of which the following is a specification.

My invention relates to improvements in feed-bags, and my object is to provide a device of this character which can be readily attached to the pole of a wagon, and from which the team of two horses may, without being unhitched from said wagon, be fed without suspending the bags from their heads.

The device is self-contained and is attached to the pole without the use of straps or other extraneous fastening devices, and when not in use it may be folded and stored in a very small space in the wagon.

In order that the invention may be fully understood, reference will now be made to the accompanying drawing; in which:
Figure 1 represents a plan view of my improved feed-bag in position on the pole of a vehicle. Fig. 2 is a front elevation of the same. Fig. 3 is a vertical central section on lines III—III of Fig. 2. Fig. 4 shows the feed-bag folded. Fig. 5 is a broken inverted plan view of the tongue and the feed-bag, showing the manner in which one pair of arms of the latter engage each other.

In carrying out the invention I employ a frame 1, consisting of two sections 2, pivotally secured together by rivets 3 so that the feed-bag may be folded into compact form for storage. Each section is, preferably, made from a single piece of rod-iron and comprises a U-shaped portion 4, a loop 5 connected to the central part of said U-shaped portion, a pair of eyes 6 connected to the ends of the U-shaped portion, an arm 7 connected to the forward eye, and an arm 8 connected to the rear eye.

The eyes are arranged in alinement to receive the pivots 3 and to permit the frame to fold to the position shown in Fig. 4.

Arms 7 are bent outward and downward in opposite directions to engage the underside of a ring A of the pole B, while the arms 8 curve downwardly beneath the pole one of which is provided with a hook 9 and the other with ratchet teeth 10, any one of which is adapted to be engaged by the hook.

By providing a plurality of ratchet-teeth, arms 8 may be adjusted to firmly grasp poles of different sizes.

12 designates a pair of feed receptacles consisting, preferably, of canvas and one of which is secured to each loop 5.

When the device is in position upon the pole the weight of the feed in the receptacles only tends to hold it more firmly on the pole, as the downward pressure causes arms 7 to spread apart and firmly engage the underside of loop A, while arms 8 are caused to tightly embrace the tongue. By arranging arms 7 to firmly engage the underside of loop A the device will be prevented from rocking upon the tongue.

The device may be readily disengaged from the tongue by grasping the outer ends of loops 5 and swinging them upwardly to the position shown in Fig. 4. Prior to raising loops 5, arms 8 and 9 are moved in opposite directions so as to disengage hook 9, from the ratchet teeth 10. This movement is possible due to the resilient nature of arms 8 and 9. This movement draws arms 7 toward each other so that they may be readily disengaged from the loop A, and spreads arms 8 apart so they may be lifted from the pole.

Having thus described my invention, what I claim is:—

A support for feed-bags composed of two sections, each of said sections being formed of a rod bent to form a U-shaped body, one of the end portions of said rod being bent to form an eye and then being bent to form a curved approximately semi-circular arm, the other end portion of said rod being bent to form an eye and then being bent downwardly and outwardly, the corresponding eyes of the two sections being arranged in alinement, rivets passed through said eyes, the outer face of the free end of the semi-circular arm of one section being formed with a series of ratchet teeth, and a hook formed on the inner face of the free end of the semi-circular arm of the other section to engage said teeth.

In testimony whereof I affix my signature, in the presence of two witnesses.

EDWARD J. COLGAN.

Witnesses:
　F. G. FISCHER,
　M. COX.